C. F. PETERSON & A. FINNEY.
LICENSE NUMBER HOLDER FOR AUTOMOBILES.
APPLICATION FILED SEPT. 14, 1914.
1,198,268.
Patented Sept. 12, 1916.
2 SHEETS—SHEET 1.
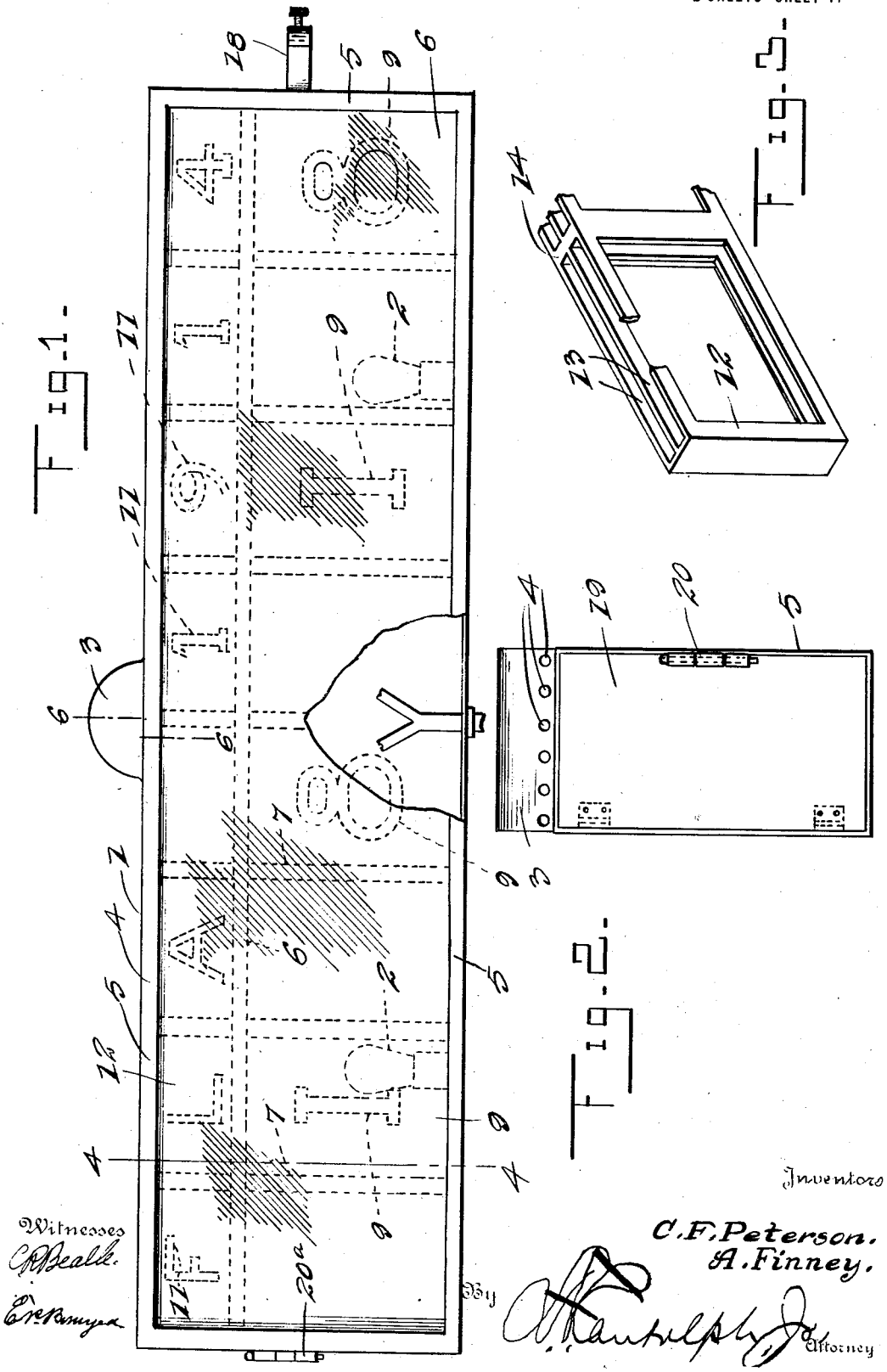

C. F. PETERSON & A. FINNEY.
LICENSE NUMBER HOLDER FOR AUTOMOBILES.
APPLICATION FILED SEPT. 14, 1914.
1,198,268.
Patented Sept. 12, 1916.
2 SHEETS—SHEET 2.
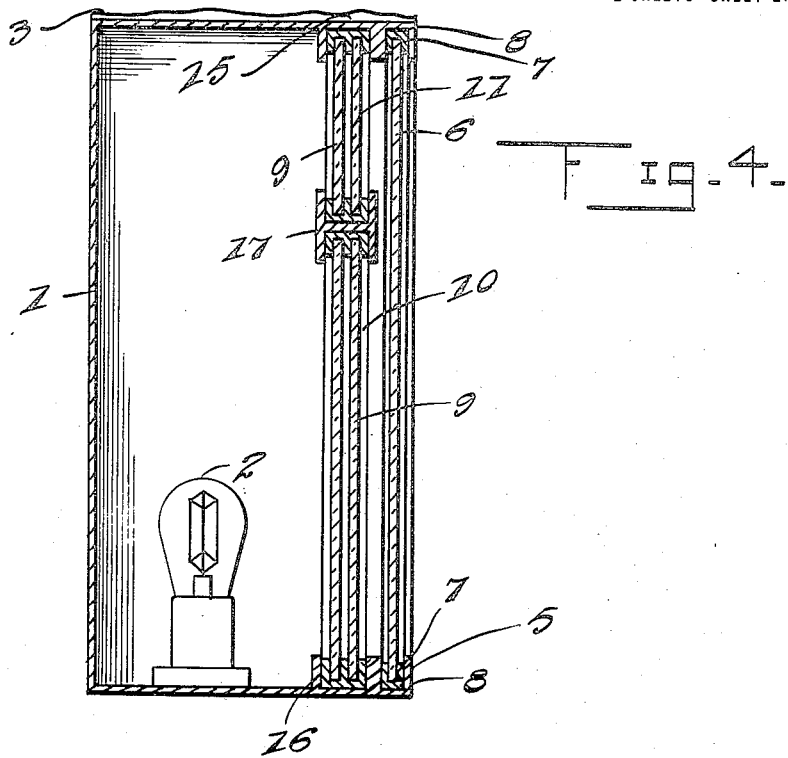
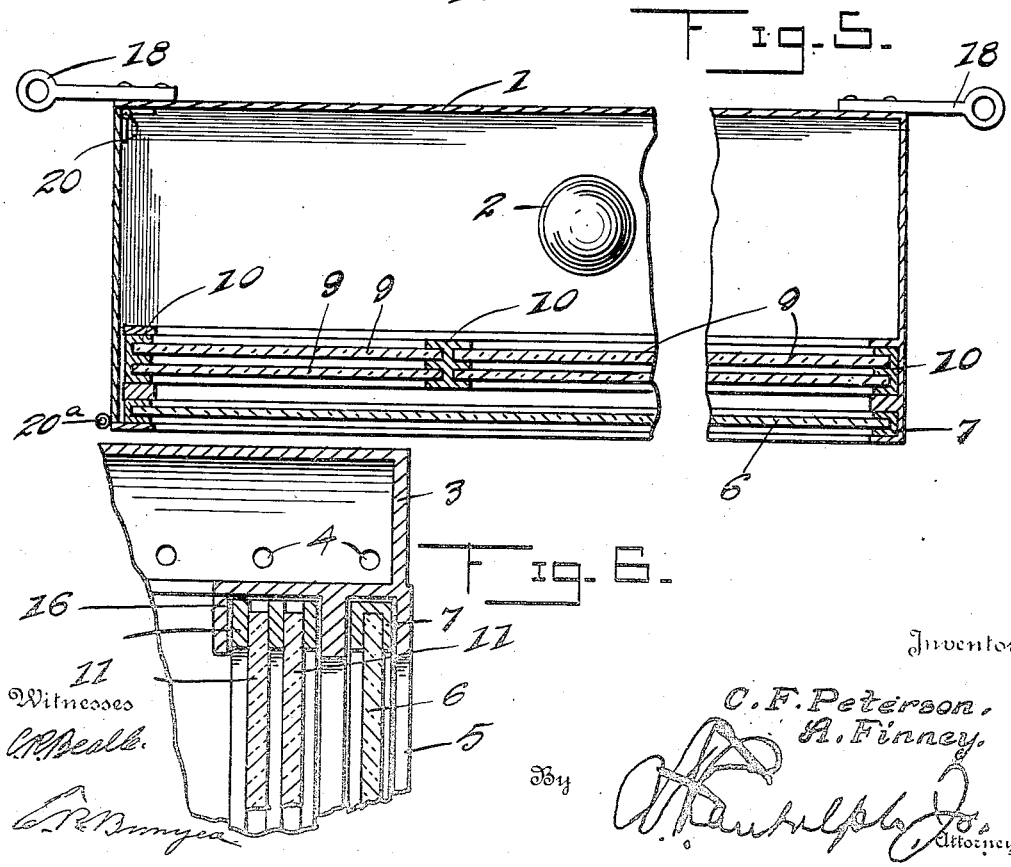
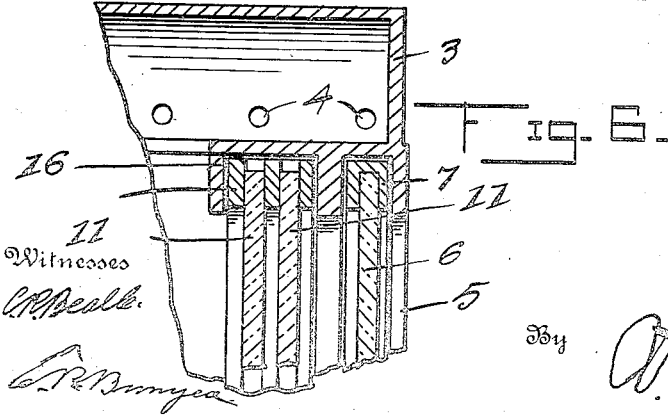

UNITED STATES PATENT OFFICE.

CHARLES F. PETERSON AND ARTHUR FINNEY, OF EAST BOSTON, MASSACHUSETTS.

LICENSE-NUMBER HOLDER FOR AUTOMOBILES.

1,198,268. Specification of Letters Patent. Patented Sept. 12, 1916.

Application filed September 14, 1914. Serial No. 861,634.

*To all whom it may concern:*

Be it known that we, CHARLES F. PETERSON and ARTHUR FINNEY, citizens of the United States, residing at East Boston, in the county of Suffolk and State of Massachusetts, have invented certain new and useful Improvements in License-Number Holders for Automobiles; and we do hereby declare the following to be a full, clear, and exact description of the invention, such as will enable others skilled in the art to which it appertains to make and use the same.

This invention relates to license number holders for auto vehicles, and one of the principal objects of the invention is to provide a casing in which removable letters and figures may be placed to indicate the State and the number of the license and date, and to provide means whereby the letters and numerals may be readily changed whenever desired.

Another object of the invention is to provide a casing in which the letters or figures to be used are printed on glass and the numerals are held in a frame adapted to slide in the casing and the letters are adapted to be deposited in pockets at the sides of the number frame, so that either the number or letters may be readily changed.

The foregoing and other objects may be attained by means of the construction illustrated in the accompanying drawings, in which, Figure 1 is a front elevation of a license number holder made in accordance with this invention and shown broken away in the center and at the bottom portion thereof, Fig. 2 is an end view showing the door through which the frame for containing the letters are inserted and removed, Fig. 3 is a detail perspective view of a portion of the frames or pockets for the letters, Fig. 4 is a vertical sectional view taken on the line 4—4 of Fig. 1, Fig. 5 is a horizontal front to rear elevation of the device shown broken away at one side of the center thereof, and Fig. 6 is a detail sectional view taken on the line 6—6 of Fig. 1.

Referring to the drawings, the numeral 1 designates the casing for the license numbers. This casing is made of metal of the required thickness and the casing is made of the required dimensions. Mounted in the casing is an electric or acetylene gas lamp 2, while at the top of the casing is a perforated hood 3 having suitable openings 4 to permit of the escape of the heat and fumes from the burner. The front of the casing is provided with a skeleton frame consisting of the flanges 5 which surround the entire front of the casing. A glass window 6 is fitted in front of the casing immediately back of the flanges 5 and this window is provided with a metal binding 7 which is fitted in a guide way 8 in the casing, and adapted to be slipped in endwise. The numbers 9 are formed upon pieces of glass and these pieces are fitted in a metal frame 10 having pockets for the glass, said frame being of the proper length to extend from end to end of the casing and having eight pockets spaced for numbers and pockets in the back for colored glass.

The letters and numbers 11 at the top are fitted in a frame 12 having vertical pockets 13 therein in which the glass letters or numbers are fitted and said skeleton frames 12 are each provided with partitions 13 as shown more clearly in Fig. 3. For holding the upper and lower frames in place, a metal keeper 15 at the top and 16 at the bottom and a double guide-way 17 between the two indicating plates or numbers are utilized. At opposite ends of the casing is a bracket 18 for securing the casing in place on the auto vehicle. A door 19 at one end of the casing is provided with a hinge 20, and when this door is opened the frames containing the numbers or letters may be readily removed and replaced by others, first removing the upper one containing the letters and date, and then sliding out the bottom one, although both frames may be removed together if desired. A pin 20ª holds the door closed.

From the foregoing it will be obvious that a license number holder made in accordance with this invention will permit ready removal of any or all of the letters and that any particular date and number may be made up and placed in the frames whenever desired.

Various changes may be made in the details of construction without departing from the spirit and scope of the invention as defined in the claim.

What is claimed is:—

A license number holder for automobiles comprising bottom, side, top and rear walls to form a casing, a door hinged to the rear wall, a skeleton frame secured to the edges of the bottom, side and top walls, a glass window slidably mounted within said frame, a metal binder surrounding the edges of said window and positioned within said frame to prevent breaking and rattling of the window within the frame, said bottom, side and top walls provided with guide ways adjacent the frame, upper and lower metallic frames slidably mounted within said guide ways, said metallic frames provided with pockets therein, glasses having numbers thereon slidably mounted within said pockets, glasses slidably mounted within said pockets and at the rear of the numbered glasses, and a double guide way positioned between the upper and lower metallic frames to hold said metallic frames in a vertical position and against lateral movement within the casing.

In testimony whereof we affix our signatures in presence of two witnesses.

CHARLES F. PETERSON.
ARTHUR FINNEY.

Witnesses:
ARTHUR JAEHNIG,
PAULINE JAEHNIG.